UNITED STATES PATENT OFFICE.

HIRAM L. HALL, OF BEVERLY, MASSACHUSETTS, ASSIGNOR TO THE BEVERLY RUBBER COMPANY.

IMPROVEMENT IN RESTORING WASTE VULCANIZED RUBBER.

Specification forming part of Letters Patent No. 19,172, dated January 19, 1858.

*To all whom it may concern:*

Be it known that I, HIRAM L. HALL, of Beverly, in the county of Essex and State of Massachusetts, have invented a new and useful Improvement in the Process of Restoring Waste Vulcanized or Hard India-Rubber—that is to say, such rubber which, being once cured or prepared by any of the processes described in the Letters Patent of the United States granted to Charles Goodyear, or any other processes applied for similar purposes, has by any reason become waste or useless, or having been manufactured into car-springs, shoes, packing, canes, and other fabrics and substances has served its purpose, or been heretofore deemed as having served its purpose, or been deemed to have become for any other cause unfit for the purpose of use, wearing, trade, or commerce—to such a soft or plastic or gummy state that it may be used again in the manufacture of india-rubber substances and fabrics; and I do hereby declare that the following is a full and exact specification of my said improvement, by which my process may be distinguished from all others for a similar purpose, together with the points therein which I claim and desire to have secured to me by Letters Patent.

Various processes have been recently had—some of which have been patented—for restoring vulcanized rubber to a soft, plastic, or gummy state; but some of them are too expensive to be extensively used in practice, requiring great care from experienced chemists and others to bring out but imperfect results. It is well known among all manufacturers of india-rubber fabrics, where the "vulcanizing process," so-called, is used, that the end aimed at in their several processes above referred to is a great desideratum, and in my experiments I have aimed at securing a simple and inexpensive process, and this I believe I have secured.

The essential feature of my improved process consists in submitting the waste vulcanized rubber which it is desired should be restored as aforesaid to the operation of boiling water in caldrons, kettles, or tanks of any description, after thoroughly grinding it between fluted or scored rollers, or what are known as "mullers," or in any other manner which will reduce the material to a finely-divided state. By boiling the mass thus treated in water for about forty-eight hours it becomes reduced to a plastic or gummy state, fit for use again in the manufacture of india-rubber fabrics in a most simple and economical manner. When cloth is combined with the vulcanized rubber lime-water or alum can be used, and with great advantage, to rot and eat up, as it were, the cloth, so that it will not appear in the new fabric. For this purpose, also, a solution of sulphuric acid may be advantageously used, the solution to consist of one part sulphuric acid to nine parts of water, or in about this proportion.

Having thus fully described my improvement, what I claim as my invention, and desire to secure by Letters Patent, is—

The process above described—viz., boiling waste vulcanized rubber in water after it has been reduced to a finely-divided state by grinding, for the purpose of utilizing the same by restoring it to a plastic state, fit to be again used in the manufacture of india-rubber fabrics, as herein set forth.

H. L. HALL.

Witnesses:
ESRA LINCOLN,
JAMES H. CLAPP.